Nov. 3, 1964  E. J. GILLHAM ET AL  3,155,762
SPECTROPOLARIMETERS
Filed Jan. 30, 1961  3 Sheets-Sheet 1

INVENTORS:
ERIC JOHN GILLHAM
RAYMOND JOHN KING

By: Stevens, Davis, Miller & Mosher
Attorneys

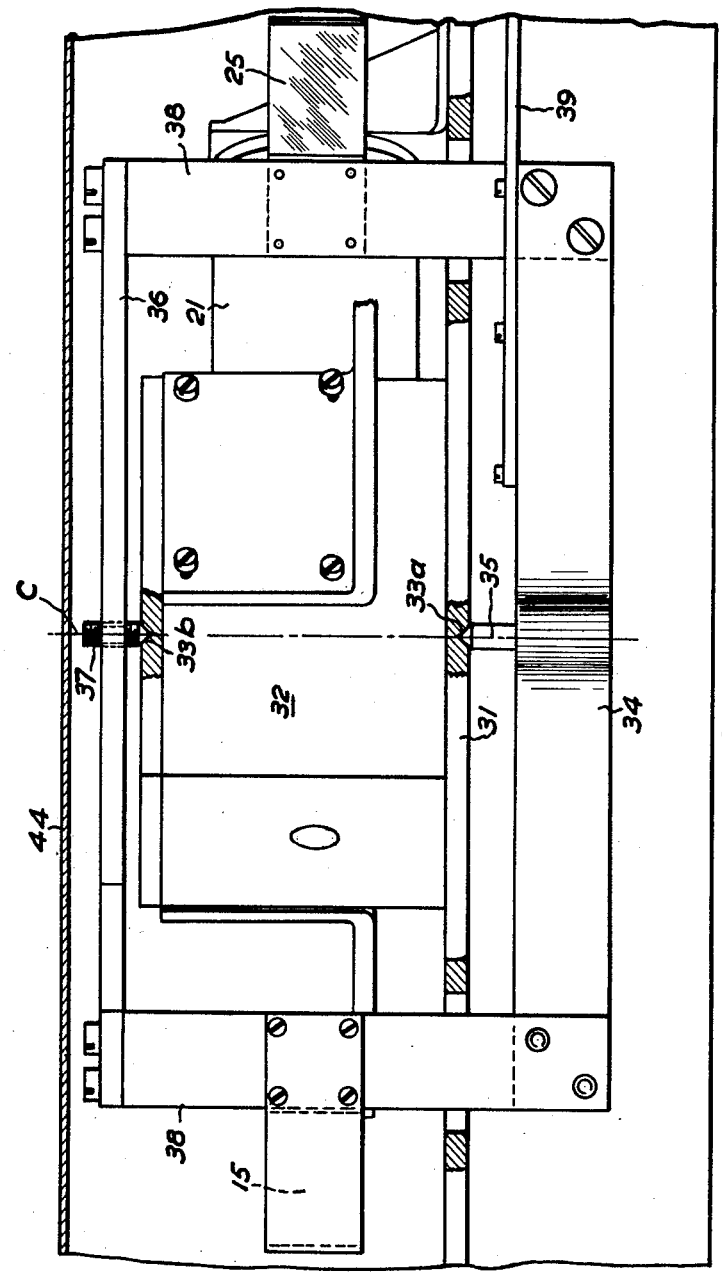

United States Patent Office 3,155,762
Patented Nov. 3, 1964

3,155,762
SPECTROPOLARIMETERS
Eric John Gillham and Raymond John King, Teddington, England, assignors to National Research Development Corporation, London, England, a British corporation
Filed Jan. 30, 1961, Ser. No. 85,676
Claims priority, application Great Britain Feb. 3, 1960
15 Claims. (Cl. 88—14)

This invention relates to spectropolarimeters, that is to say, instruments which enable the optical activity of a specimen to be measured at various wave-lengths of light.

According to the present invention the ray path through the spectropolarimeter has interposed in it two prisms of birefringer's material on opposite sides of the specimen position and means for selecting the wave-length transmitted to the receiving point of the instrument and ensuring that the ray path through the instrument includes the path of the ordinary ray of the selected wave-length through one prism and the path of the extra-ordinary ray of the same wave-length through the other prism. Consequent upon this arrangement, the two prisms act respectively as polariser and analyser and at the same time they act in conjunction with selecting means substantially as a double monochromator.

An advantage of the invention is that the number of optical elements is kept down (while cemented surfaces are avoided) so that, particularly at the short wave-length end of the spectrum where it is difficult to avoid absorption, decrease in reflectivity of mirrors, and scatter, the losses of light are kept to a low value. There is the added advantage of simplicity and reduction of cost.

The selecting means may take various forms, e.g. movement of a slit or slits in the ray path but preferably adjustable light redirecting elments are used and they are preferably arranged to be adjusted in co-ordination to effect the selection of wave-lengths for both prisms simultaneously. Such co-ordinated redirecting elements are conveniently plane mirrors one associated with each prism which are rotated to select the wave-length. By suitable disposition of the parts it becomes possible to arrange for them to be rotated on a common axis in the same direction and at the same rate which makes for mechanical simplicity.

It would be possible to obtain a setting of the instrument by rotating one or both of the prisms about the axis of the ray but as it is highly desirable that the prisms should remain fixed in position, the rotation produced by the specimen may be balanced out by a compensating element. A convenient device for the purpose is a Faraday cell, the excitation current of which can be regulated. Though not essential it is also highly desirable to provide some means for detecting when exact compensation balance is achieved, for example, a modulator which oscillates the plane of polarisation of the light through an angle up to say 30° whereby an out of balance A.C. signal can be obtained by the aid of a photoelectric device at the exit slit. The signal can be used to provide a feed back to the compensating Faraday cell and the signal may also be indicated or recorded. Details of such arrangements are to be found in application Serial No. 698,555, filed November 25, 1957, owned by the assignee of the present application, but now abandoned.

To reduce absorption and to avoid difficulties due to variations in wave-length, the collimating and focussing system may be made up entirely of reflecting elements. The prisms may be of crystalline quartz which has good transparency in the ultra-violet region, while the modulator may be made of sector discs of crystalline quartz, or it may be a Faraday cell.

The invention will be further described with reference to the accompanying diagrammatic drawings.

FIGURE 3 is an elevation, on a larger scale, of part of FIGURE 2.

Figure 1:
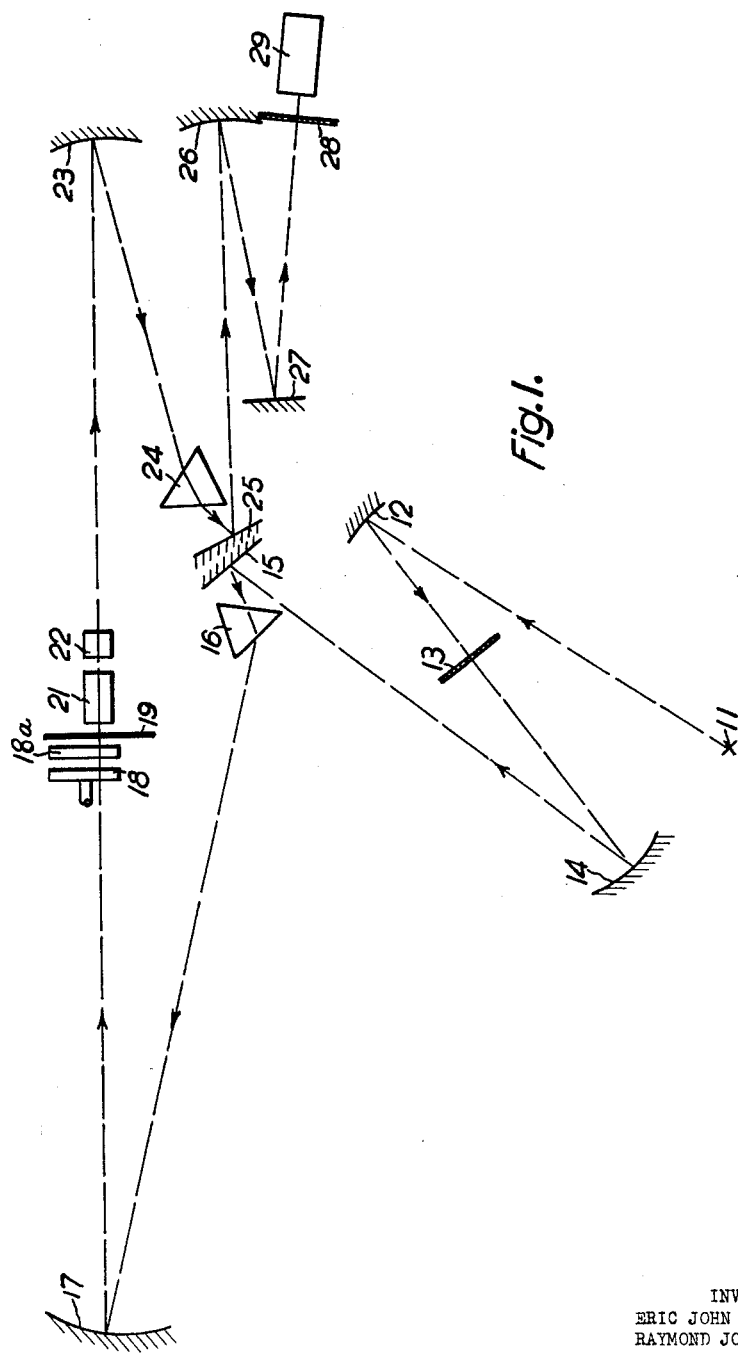
FIGURE 1 illustrates the lay-out of a first system embodying the invention.

In the system shown in FIGURE 1 light from a source 11 is imaged on to an entrance slit 13 by means of a concave mirror 12. From the slit 13, the light is directed onto a mirror 14 forming a collimator and thence the light reaches a first plane mirror 15 rotatable about an axis perpendicular to the plane of the drawing, which redirects the light through a first crystalline quartz prism 16. From the prism the beam is redirected by a second concave mirror 17 thence through a modulator 18, intermediate slit 19 upon which the beam is focussed by the mirror 17, compensating Faraday cell 21, a specimen cell 22 and so on to a third concave mirror 23 having its focus at the slit 19. The focussing of the beam at the intermediate slit 19 is effected in order to separate the various rays produced by the prism dispersion as is common in most monochromators. From here the beam is directed through a second crystalline quartz prism 24 similar to the prisms 16 with regard to orientation of optic axis. By giving the optic axis of both prisms the same direction, the polariser and analyser are crossed, but other arrangements are possible within the scope of the invention. From prism 24 the beam passes to a rotatable plane mirror 25 and via a further focussing mirror 26 and another mirror 27 provided for convenience in lay-out, to an exit slit 28 behind which is placed a photo-multiplier 29.

Figure 2:
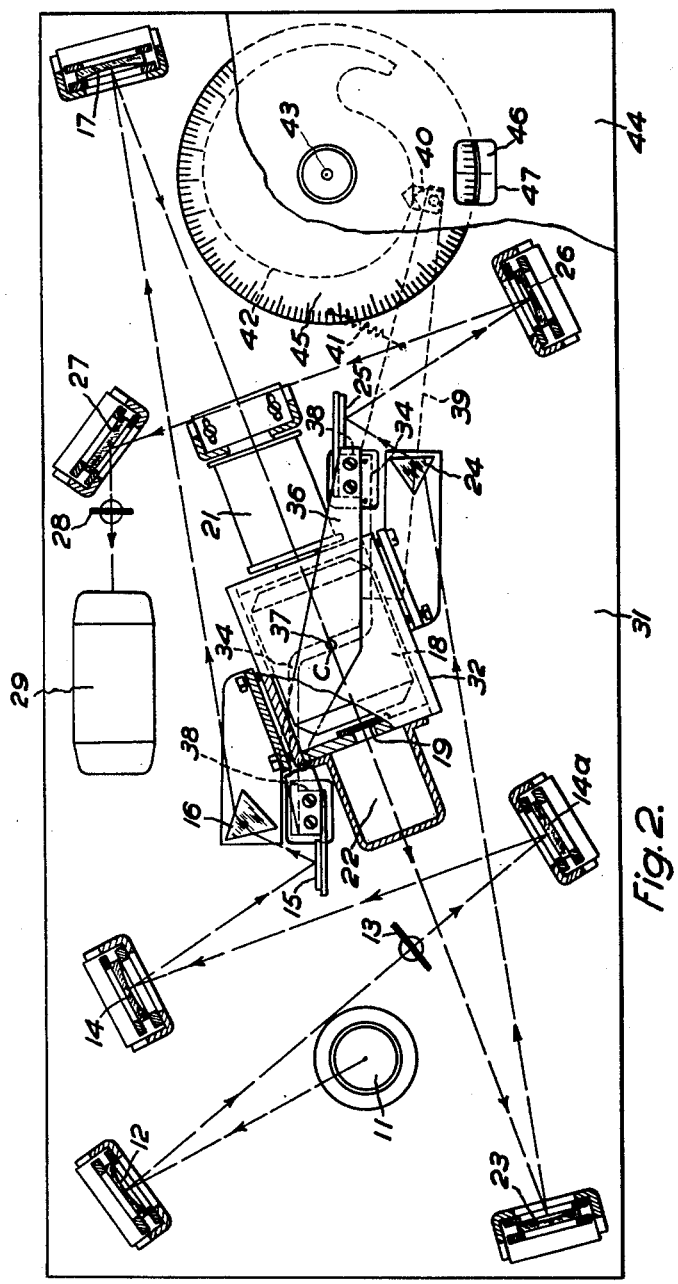
FIGURE 2 is a plan view showing the lay-out of a second such system, with most of a dust cover and some other details removed.

In FIGURE 2 the general lay-out is similar to that of FIGURE 1. Accordingly the same references have been used for corresponding parts, and the above description applies with the following changes. First there is an additional plane mirror 14a between the split 13 and concave mirror 14 merely for convenience in locating the various parts. Second the slit 19, modulator 18, and cell 21 are in a different order, again a mere matter of convenience.

There are also other differences. Thus, though in both figures, to keep the ray path clear, the ray has to be angularly deviated at the mirrors 17 and 23, in FIGURE 1 to bring the two plane mirrors 15, 25 close together, the deviation at the mirrors 17 and 23 is to the same hand with reference to the sense of the ray path while in FIGURE 2 it is to the opposite hand. It can be shown that when a beam of light is reflected, its plane of polarisation is twisted by a purely geometrical effect, except in the particular case when the initial and final beam are parallel to each other. In the lay-out of FIGURE 1, this effect produces a slight variation in the plane of polarisation over the aperture of the beam, so that the polarimeter balance position which is controlled by the mean plane of vibration over the whole aperture will be sensitive to changes in the illumination distribution which it may be difficult to avoid with a practical light source. In FIGURE 2 on the other hand, the plane of polarisation does not vary over the aperture owing to the geometrical effect so that the system is much less sensitive to change in illumination distribution and is therefore preferred.

There is one effect in respect of which the lay-out of FIGURE 2 is less favourable than that of FIGURE 1, but it is much smaller than the effect described above. This is a rotation of the vibration plane due to unequal reflection of the two components into which the incident ray can be resolved in relation to the plane of incidence.

This effect can be kept small by keeping the angular deviation as small as possible at these two concave mirrors.

In both systems the two prisms are so set and the two plane mirrors 15, 25 so relatively arranged that for any specific chosen wave-length, if the path through the first prism 16 is that of the extra-ordinary ray, that through the second prism 24 for the ray of the same wave-length is that of the ordinary ray or vice versa. It can be shown that in selecting the wave-length by rotating the mirrors 15, 25 they should rotate in the same direction and further that though the extra-ordinary ray is being used in one prism and the ordinary ray in the other so that for any one wave-length their effective refractive indices are different, it is possible by making the ray traverse the two prisms at somewhat different angles to track right through the spectrum from say 590 mμ to 200 mμ with equal rotation of the two mirrors with an error of less than one minute of arc. The two mirrors can therefore be attached to a common support and rotate in unison about a common axis. By suitable disposition to the parts the common axis can be chosen to avoid lateral shift of the collimated beam as the mirrors rotate during wave-length scanning. This applies to FIGURES 1 and 2 and its application in FIGURE 2 will be described below.

The two prisms 16, 24 are both cut so that the optic axis is at right angles to the direction of the light beam within the prism, conveniently with the optic axis either perpendicular to the prism base or parallel to its refracting edge. In setting up the instrument the two prisms may be set at approximately the correct angles obtained from ray tracing and using a light source such as a medium pressure mercury arc and narrow monochromator slits, an attempt is made to track through the spectrum by rotating the two mirrors 15, 25 simultaneously and equally. If the tracking is not correct, one of the prisms is rotated slightly and the test is repeated. It is found that satisfactory tracking can be obtained by adjustments which can be effected in quite a short time.

In the lay-out shown in FIGURE 2 the two plane mirrors 15, 25 though a long way apart are mounted on a common support and rotate on a common axis C. Since this is midway between them and intersects the modulator 18, a supporting structure which clears the modulator must be used. A convenient arrangement is shown in FIGURE 3.

The various fixed parts of the apparatus are mounted on a base-plate 31. On this is secured a box 32 in which the modulator 18 is enclosed. The axis C is defined by countersinks 33a, 33b on the underside of the base plate and upper side of the top of the box. A lower lever 34 carries a pivot 35 engaging in the countersink 33a and an upper lever 36 carries a screwed-in pivot 37 engaging in the countersink 33b. The levers 34, 36 are connected together at their ends by posts 38, one of which carries the mirror 15 and the other the mirror 25.

Due to this lay-out the two mirrors 15, 25 make considerable bodily movements during their rotation but they are both located in parts of the beam in which the rays are parallel so that focussing is not affected. Also they move in such a way that any lateral movement in relation to the rays is very small and thus the mirrors do not need to be much larger than the cross section of the beam.

In this particular example, the rotation about the axis C is effected by the aid of an arm 39 secured to the lever 34 and carrying a follower 40 which is held by the action of spring 41 in engagement with a cam 42. The latter is carried on a shaft 43 the upper end of which projects through the dust cover 44 to enable it to be rotated by any convenient means such as a knob or a tangent wheel and screw. The shaft 43 also carries a scale 45 cooperating with an index 46, the latter and part of the scale being visible through a window 47. The scale may desirably be calibrated in wave lengths.

The lay-out illustrated can be varied. Since the beam between prism 16 and mirror 17 is parallel and that between mirror 23 and prism 24 is also parallel, as well as the mirrors 15 and 25 being interposed in parallel parts of the beam, there is considerable freedom in placing the prisms and their associated plane mirrors 15 and 25. For instance the deviation produced at the mirrors 17, 23 while still being equal and to the opposite hand could be out of the plane of the drawing, enabling one prism and plane mirror 15 or 25 to be arranged above the elements 18 to 22 and the other below in which case they could again have a common support apertured or bent to clear the elements 18 to 22. Other relative arrangements are also possible and it may here be mentioned that for example the plane mirrors 15 and 25 could be on the other side of the respective prisms though the disposition shown is preferred because the plane mirrors might otherwise affect the state of polarisation of the beam.

The wave-length scale as in all prism monochromators is not linearly proportional to the rotation of the mirrors 15, 25 but is more open in the shorter wave-length region but if the slits 13, 28 are of constant width, the spectral resolution will gradually increase at shorter wave-lengths and this expansion of the scale will therefore be an advantage. In an instrument intended to operate automatically, it is convenient to effect the rotation of the mirrors by a tangent screw geared to a synchronous motor which can also drive a chart on which a record is made. Such a tangent screw could for example mesh with a worm wheel on the shaft 43 in FIGURE 2.

The oscillations produced by the modulator 18 need to be through an angle of some degrees. Both precision and accuracy should improve pregressively with decreasing angles of swing, until a limit is reached where the sensitivity is so small that extraneous disturbances such as dark current and amplifier noise begin to take effect; but even before this, presence of unpolarised or elliptically polarised light due to scattering or birefringence in the optical components usually sets a limit. In practice a total swing of at least 6° is desirable and appreciably a little more at the shorter wave-lengths where less light is available.

One form of modulator indicated in FIGURE 1 is a rotating sector disc, that is to say, a disc having sectors of optically active material which oscillate the plane of polarisation alternately to either side of the beam position. Since it is desired to go down to short wave-lengths, the sector disc is preferably made of crystalline quartz cut perpendicular to the optic axis. In theory it would be possible to use alternate sectors of laevo- and dextro-rotatory quartz, all of equal thickness. In practice, however, the thickness would be inconveniently small, for a reasonable half-shadow angle. It is therefore preferable that the sectors should all be of the same type of quartz, and that alternate sectors should differ in thickness by the amount required to give the desired half-shadow angle. Since the plane of polarisation must oscillate symmetrically about its original direction, it is also necessary to have a fixed compensating plate (indicated at 18a FIGURE 1) of thickness equal to the mean thickness of the sector disc, and with optical activity of the opposite sign. The sector plate and compensating plate are mounted free without the use of cement to avoid absorption in the ultra-violet. The sector disc and compensating plate may be mounted close together to minimise the effects of slight movements of the illuminated patch on the collimator mirrors with changing wave-length. Also the disc may have one face very slightly curved to minimise interference effects and to allow some adjustment by movement between the compensating plate and sector disc. The modulator unit must be very carefully aligned.

The practical difficulties presented by a sector disc modulator can be avoided by using a Faraday cell as a modulator, as indicated in FIGURE 2, but here the difficulty is that the only material sufficiently transparent in the ultra-violet region has a relatively low Verdet constant. However, synthetic fused silica can be used since over a path length of several centimeters it has no significant absorption at 200 mμ but the magnetic field required involves a heavy current and water cooling would probably be required therefore to dispose of the heat developed. The Verdet constant of this material increases at shorter wave-lengths so that the angle of swing would increase with decreasing wave-length, a feature which in itself is desirable as mentioned above.

If a small or spectral range down to say a wave-length of 320 m$\mu$ is considered adequate, a Faraday cell modulator using light flint glass may be used. A 1 inch length included in the core of a choke can be constructed to provide an oscillation of the plane of polarisation through ±3° at 546 m$\mu$ with an alternating current of 1.9 amps. R.M.S. value and the expenditure of approximately 50 watts.

The compensator 21 can very suitably be a Faraday cell because the angles involved are much smaller than necessary in the modulator. There are many advantages in using small rotations because this enables thinner or more dilute specimens to be used. While the optical rotation is directly proportional to the thickness or concentration, the transmission is an exponential function so that if the thickness or the concentration is too high, its optical density becomes too great. A very suitable construction of Faraday cell may have a core of synthetic fused silica of 5 centimeters length with a winding of 65,000 turns of 42 S.W.G. (0.101 mm.) copper wire having a resistance of 12,500 ohms.

As above mentioned the Verdet constant changes with the wave-length of the light. With this construction and an appropriate electronic circuit a full scale reading of 0.1° is obtained on a wave-length of 546 m$\mu$, a full scale reading of approximately 0.2° at 400 m$\mu$, of 0.4° at 300 m$\mu$ and of 1° at 210 m$\mu$. Although the scale is linear, i.e. the measured current is proportional to specimen rotation, the magnitude scale changes continuously with wave-length, varying according to the Verdet constant of the core material of the compensating Faraday cell. If the natural rotatory dispersion of the specimen under measurement exactly matches the Verdet constant dispersion of the core material, the output trace will be of constant value through the spectrum. Any departure from this condition will result in a variation of the output, and thus any anomalous optical activity will show up very clearly. If the relationship between the Verdet constant of the core material and wave-length is known or ascertained, a master calibration curve can be prepared which fits over the recorder paper and enables actual rotation to be directly read off from the recorded trade. Alternatively it would be possible to couple mechanically a variable resistance or potentiometer to the wave-length drive, and by this means compensate electrically and automatically for the change of Verdet constant with wave-length, and so give a record in terms of actual rotation.

It will be understood that if a Faraday cell is used as the modulator, the same cell can also be used as the compensator, it merely being necessary to superimpose the two fields by means of the same or different windings as convenient.

It will be clear that the instrument is not limited to the parts 18, 21 and 22 being arranged in the order or position shown in FIGURE 1 or FIGURE 2. Provided they are located in the beam between the prisms 16, 24, their position and order are optically unimportant. However, there are practical advantages in arranging the modulator and compensator as close as conveniently possible to the intermediate slit 19 because at this location the cross sectional area of the beam is at a minimum and the required aperture of these components is therefore the smallest possible. It should here be mentioned that because the system of prisms and mirrors constitutes a monochromator of the additive type, the intermediate slit 19 can be appreciably wider than the slits 13, 28. If desired the slits, especially the slits 13, 28 may be of adjustable width.

The light source must be of high intensity with as continuous a spectrum as possible over the range required. A suitable source is an xenon arc. Suitable lamps are available on the market having a consumption of 150 watts and a current of 7.5 amps and more powerful lamps are also available. Unfortunately the xenon arc shows a tendency to wandering in its position and for the reasons above noted, therefore, the lay-out of FIGURE 2 is considerably better than that of FIGURE 1 because it is much less affected by wandering of the arc. The system is relatively insensitive to variations in overall light flux.

A suitable photoelectric cell 29 is a photomultiplier having say 13 stages and having a silica window. The electronic circuit and feed-back to the compensator 21 may be on the lines described in co-pending application Serial No. 698,555, filed November 25, 1957, by Eric John Gillham et al., owned by the assignee of the present application, but now abandoned, however, it is desirable to provide an automatic gain control circuit for the photomultiplier E.H.T. voltage. Such additional control is necessary because in an instrument covering a wide spectral range, the radiation energy reaching the photomultiplier will vary considerably at different wave-lengths. Such a control has the advantage that no mechanical parts are involved as would be the case if the intensity were controlled by varying the slit width. Such slit width control is undesirable also because this could easily alter the distribution of illumination over the aperture with the disadvantages above discussed and would also change the spectral resolution very rapidly in the region of an absorption band of the specimen. In spite of this however, in some cases some gradual slit widening with decreasing wave-length may be desirable. It should be mentioned that the various mirrors may conveniently be of the aluminised type.

It should also be mentioned that a certain amount of stray light is unavoidable because the mirror and prism system passes not only the selected wave-length but one half of the system also passes a wave-length above and the other half a wave-length below the selected wave-length due to an ordinary ray of a particular different wave-length in the one prism coinciding with the selected extraordinary ray and an extra-ordinary ray of a particular different wave-length coinciding with the selected ordinary ray. Thus for these two further wave-lengths the system acts as a single monochromator as far as scatter is concerned while for other wave-lengths the conditions of a double monochromator apply and the scatter will be correspondingly smaller. A very small amount of scattered light may also be present from other causes. The scattered light is, however, largely unpolarised and is therefore unaffected by the modulator 18. The amplifier connected to the photomultiplier will therefore be unaffected by this D.C. background and the balance position of the polarimeter will therefore also be unaffected. Scattered light would only become of importance if its magnitude is comparable with or larger than the modulated signal of the correct wave-length. The scattered light tends to increase at shorter wave-lengths and it is for this reason that it is desirable for the angle of swing produced by the modulator to increase as the wave-length decreases.

What we claim is:

1. A spectropolarimeter including means for producing a beam of light, a first prism of birefringent material located in the optical path of the beam for dispersing the light and directing along a predetermined ray path one of the rays, ordinary and extraordinary, of a selected wave length, a second prism of birefringent material located following said first prism on said ray path and set in an attitude to present to light arriving along said ray path a path for transmission through it for the other of the rays, ordinary and extraordinary, of the selected wave length, means for confining the passage of light from said first to said second prisms to said ray path whereby only light of the selected wave length can reach said second prism, means for confining the passage of light leaving said second prism to light of the other of the rays ordinary and extraordinary of the selected wave length, whereby said first and second prisms act in conjunction as a double monochromator and at the same time respectively as polariser and analyser, means for holding a specimen to be examined in the spectropolarimeter in said ray between said prisms, and means for evaluating the rotation of the plane of polarisation produced by the specimen by reference to light of the selected wave length emerging from said second prism.

2. A spectropolarimeter according to claim 1 in which the means for confining the passage of light comprises adjustable light redirecting elements associated with each prism.

3. A spectropolarimeter according to claim 2 in which the redirecting elements are plane mirrors one associated with each prism, which are rotatable to select the wavelength.

4. A spectropolarimeter according to claim 3 in which the plane mirrors are disposed on the entrance side of the prism through which the beam first passes and on the exit side of the other prism.

5. A spectropolarimeter according to claim 2 in which means are provided for adjusting the redirecting elements associated with one prism in co-ordination with the redirecting elements associated with the other prism thereby to select the wave lengths for both prisms simultaneously.

6. A spectropolarimeter according to claim 3 including a common rotatable support for said plane mirrors whereby they are rotated simultaneously at the same rate and in the same direction, said prisms being disposed so that the selected ray traverses them at somewhat different angles such that only a negligible error in the ray path results in adjusting through the whole range of wave lengths covered.

7. A spectropolarimeter according to claim 1 having the two prisms fixed, and also including additional means located in the ray path between said prisms for compensating the rotation of the plane of polarisation produced by the specimen.

8. A spectropolarimeter according to claim 7 in which the additional means is a Faraday cell.

9. A spectropolarimeter according to claim 7 also including means located in the ray path for oscillating the plane of polarisation of the beam, and in which said means for evaluating the rotation of the plane of polarization comprises a photoelectric device located in the ray path following said means for confining the passage of light leaving said second prism, whereby an out-of-balance signal is obtained if the rotation of the plane of polarisation produced by the specimen is not compensated by said compensating means.

10. A spectropolarimeter according to claim 9 wherein said means for oscillating the plane of polarisation includes a rotating sector disc of crystalline quartz and a compensating plate also of crystalline quartz which maintains the mean of the oscillation in the original position.

11. A spectropolarimeter according to claim 9 in which said means for oscillating the plane of polarisation includes a Faraday cell excited by an alternating current.

12. A spectropolarimeter according to claim 1 wherein said means for producing a beam of light and means for directing the beam include a light source and a concave mirror disposed to provide a collimated beam for transmission through the first prism, a similar mirror succeeding the second prism, an intermediate slit at a point in the path of the light in the neighborhood of said means for holding a specimen, a concave mirror in the path of the light leaving the first of said prisms and focusing it at said intermediate slit, and a second concave mirror located in the path of the light between said intermediate slit and said second prism and having its focus at said intermediate slit.

13. A spectropolarimeter according to claim 12 also including means located in the ray path between said prisms for compensating the rotation of the plane of polarisation of the beam by the specimen and means for oscillating the plane of polarisation of the beam, both said means located close to the intermediate slit.

14. A spectropolarimeter according to claim 1 in which the two prisms are of crystalline quartz.

15. A spectropolarimeter according to claim 1 wherein said prisms are positioned on opposite sides of the axis of the ray path that said ray takes through said means for holding a specimen to be examined, and the spectropolarimeter also includes two reflectors one of which reflectors is located in the path of the ray emerging from said first prism and redirects it into said specimen holding means and the other of which is located in the path of said ray leaving said specimen holding means and redirects it into said second prism.

References Cited in the file of this patent

UNITED STATES PATENTS

| 2,974,561 | Hardy et al. | Mar. 14, 1961 |

FOREIGN PATENTS

| 23,617 | France | July 19, 1921 |
| | (1st add. to 501,330) | |
| 724,224 | Germany | Aug. 20, 1942 |